(12) United States Patent
Mitsui et al.

(10) Patent No.: US 6,286,839 B1
(45) Date of Patent: Sep. 11, 2001

(54) RING SEAL INCLUDING A CORE SURROUNDED BY A METAL JACKET

(75) Inventors: Takayoshi Mitsui; Takahiro Kariya, both of Arida (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 0 days.

(21) Appl. No.: 09/182,184

(22) Filed: Oct. 30, 1998

(30) Foreign Application Priority Data

Oct. 31, 1997 (JP) .................................................. 9-300988

(51) Int. Cl.⁷ ....................................................... F16J 15/12
(52) U.S. Cl. ........................... 277/603; 277/611; 277/612; 277/626; 277/647
(58) Field of Search ..................................... 277/603, 608, 277/612, 626, 627, 644, 647, 650, 652, 653, 611

(56) References Cited

U.S. PATENT DOCUMENTS

| 3,336,659 | * | 8/1967 | Staples et al. . |
| 3,775,832 | * | 12/1973 | Werra . |
| 3,869,132 | * | 3/1975 | Taylor et al. . |
| 4,548,415 | * | 10/1985 | Bendl . |
| 4,561,662 | * | 12/1985 | de Villepoix et al. . |
| 4,603,892 | * | 8/1986 | Abbes et al. . |
| 4,817,994 | * | 4/1989 | Bronnert . |
| 5,076,617 | * | 12/1991 | Bronnert . |
| 5,193,616 | * | 3/1993 | Hynes . |
| 5,538,262 | * | 7/1996 | Matsumura . |

* cited by examiner

Primary Examiner—James R. Brittain
Assistant Examiner—John L. Beres
(74) Attorney, Agent, or Firm—Wenderoth, Lind & Ponack, L.L.P.

(57) ABSTRACT

A ring seal contains a core made from an elastic organic polymer and a metal jacket having a U-shaped sectional shape, which jacket surrounds the core to prevent transfer of a substance generated from the core into the sealed space. The seal of the present invention does not release a foreign material into the sealed space, nor does it require a great force for clamping. Accordingly, it is useful as a vacuum seal that achieves miniaturization and reduced weight of a vacuum apparatus. In particular, by making the sectional shape of the metal jacket a U shape, the core can be easily detached and attached for fitting after forming the jacket, and the inside of the jacket can be washed easily.

1 Claim, 5 Drawing Sheets

RING SEAL INCLUDING A CORE SURROUNDED BY A METAL JACKET

TECHNICAL FIELD OF THE INVENTION

The present invention relates to a seal. More particularly, it relates to a ring seal suitable as a vacuum seal.

BACKGROUND OF THE INVENTION

In fields easily affected by the presence of a foreign material, such as the semiconductor field, there is a demand for a ring vacuum seal that does not release gas or particles. As a sealing ring, there have been conventionally known a rubber O ring (ring having an O sectional shape when cut to open the ring), a metal O ring, a C ring with a coil spring and the like. Of these, the rubber O ring is unsuitable for use as a vacuum sealing ring in this field, since it releases gas or particles. In contrast, the metal O ring serves as a vacuum seal, because it does not release a foreign material when washed thoroughly with water before use. However, this ring requires tight clamping for the exhibition of sufficient sealing function, which in turn gives rise to a need for a large clamping mechanism that can provide enough clamping force, consequently making the vacuum apparatus bulky.

As disclosed in Japanese Utility Model Unexamined Publication No. 92870/1989, for example, a C ring with a coil spring has a structure wherein a hard metal (e.g., stainless) helical coil is housed in a jacket having a C sectional shape. As this ring is made exclusively from metal materials, it, like a metal O ring, does not release a foreign material when washed thoroughly with water before use and the force necessary for clamping this ring is not as big as that for the metal O ring. Even this C ring with a coil spring, nevertheless, still requires a greater force than a rubber O ring to clamp the helical coil set inside. This in turn makes the clamping mechanism comparatively large, again making the vacuum apparatus bulky.

It is therefore an object of the present invention to provide a seal that does not release a foreign material into the sealed space and that does not require a great force for clamping.

SUMMARY OF THE INVENTION

The present invention provides the following.

(1) A ring seal comprising a core made from an elastic organic polymer and a metal jacket having a U-shaped section, which jacket surrounds the core to prevent transfer of a substance generated from the core into a sealed space.

(2) The seal of the above (1), wherein the metal jacket comprises a means for preventing the core from extruding from an opening of the metal jacket when said jacket is clamped to close the opening.

(3) The seal of the above (1), wherein the metal jacket has a lip on its outer surface, which improves its sealing property.

(4) The seal of the above (1), wherein the core is an O ring made from an elastic organic polymer, and the ring seal is a circular seal.

(5) The seal of the above (4), wherein the metal jacket of the ring seal has a lip on its outer surface, which improves its sealing property.

(6) The seal of the above (5), wherein the lip has a vertex in a parallel relation to the pressure receiving surface when the seal is clamped, and the intersection of the normal line at the outermost point of the section the ring and the perpendicular line drawn from the vertex toward the normal line falls within the range of from 0.1 to 0.7 times the radius of the O ring, from the center of the O ring.

DETAILED DESCRIPTION OF THE INVENTION

In the present invention, a metal jacket seals a gap and a core made from an elastic organic polymer mainly presses the surrounding jacket. Even if a gas or particles is/are released from the rubber core, they are prevented by the metal jacket from moving into a sealed space, such as a vacuum apparatus and the like in a semiconductor manufacture plant. In addition, the metal jacket has an opening that allows deformation to close its opening with a relatively small clamping force, and the clamping force on the elastic organic polymer core can be smaller than the force applied on a metal O ring or helical coil set inside a C ring with a coil spring, so that the clamping force required by the seal as a whole becomes smaller.

Figure 1:
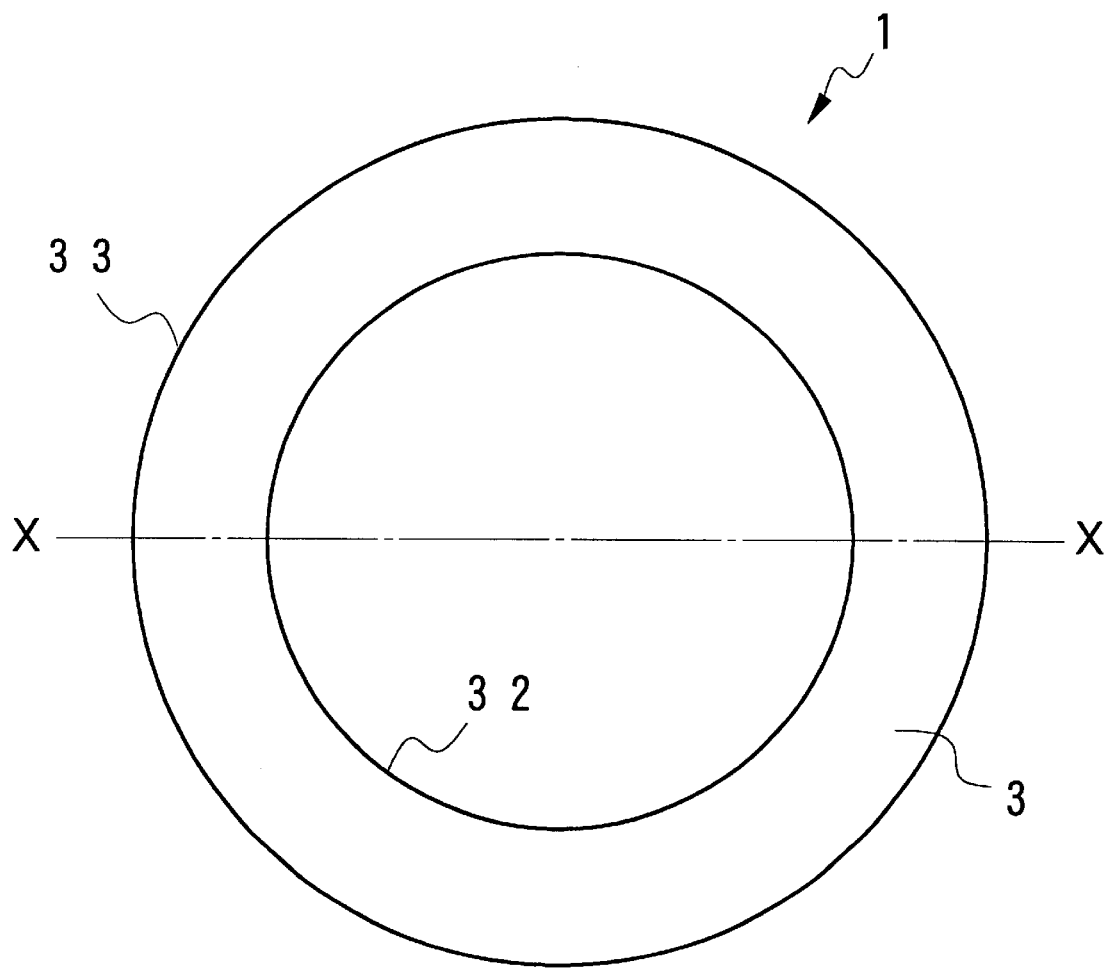
FIG. 1 is a plan view showing one embodiment of the present invention when the seal has not been clamped, wherein 1 is a ring seal and 3 is a metal jacket.
Figure 2:
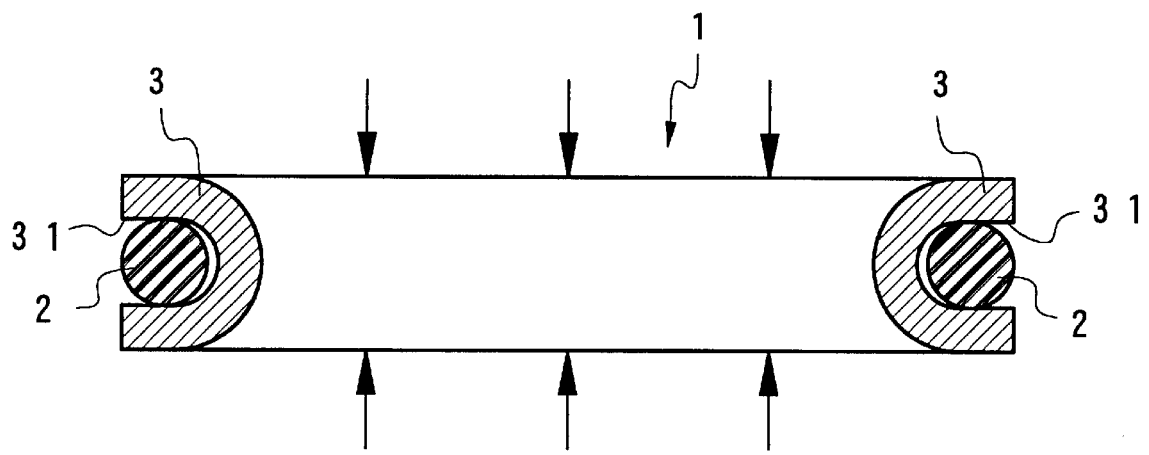
FIG. 2 is a sectional view of FIG. 1 taken along line X—X, wherein 2 is an O ring formed from an elastic organic polymer and 31 is an opening of the metal jacket 3.
Figure 3:
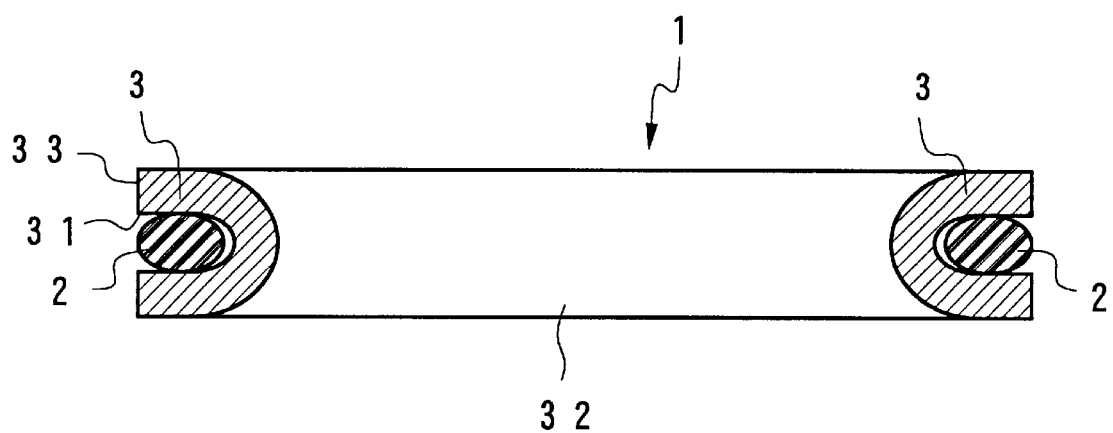
FIG. 3 is a sectional view of the embodiment of FIG. 1 taken along line X—X, wherein the seal has been clamped.
Figure 4:
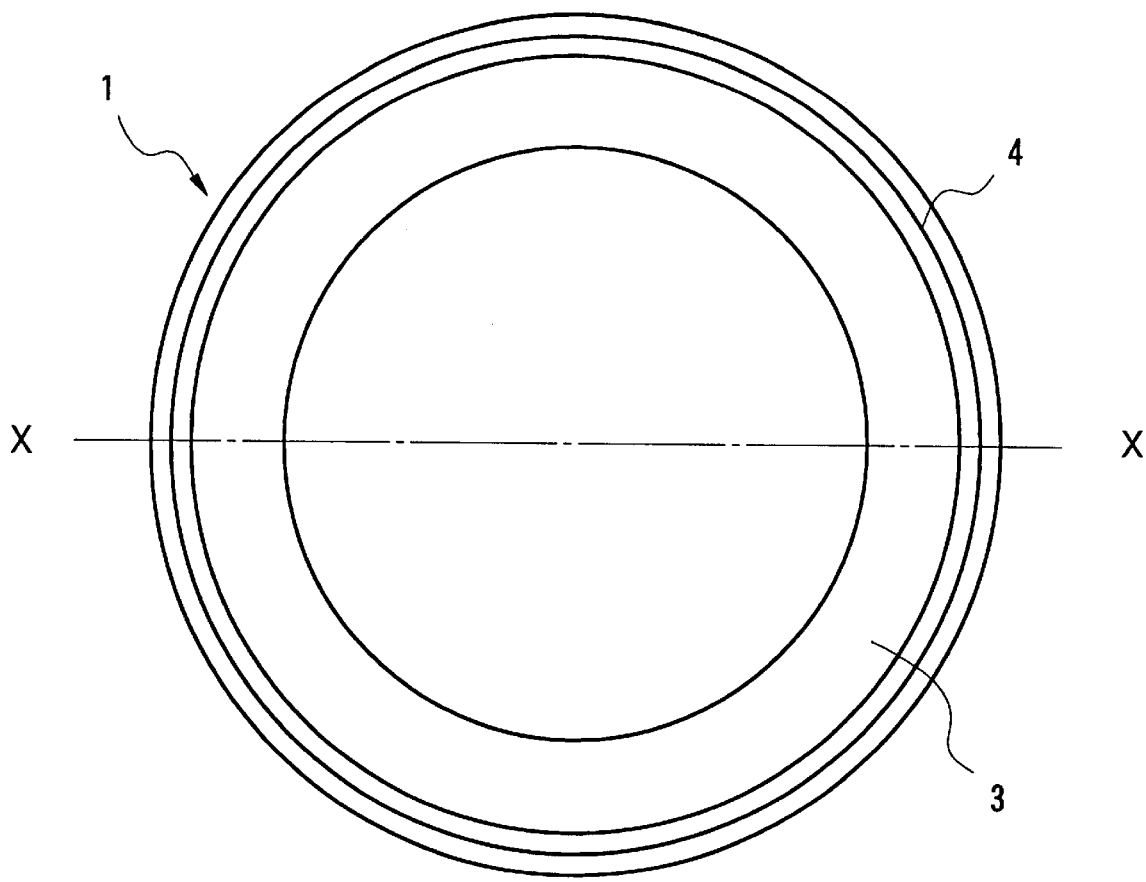
FIG. 4 is a plan view of another embodiment of the present invention when the seal has not been clamped, wherein 4 is a lip.
Figure 5:
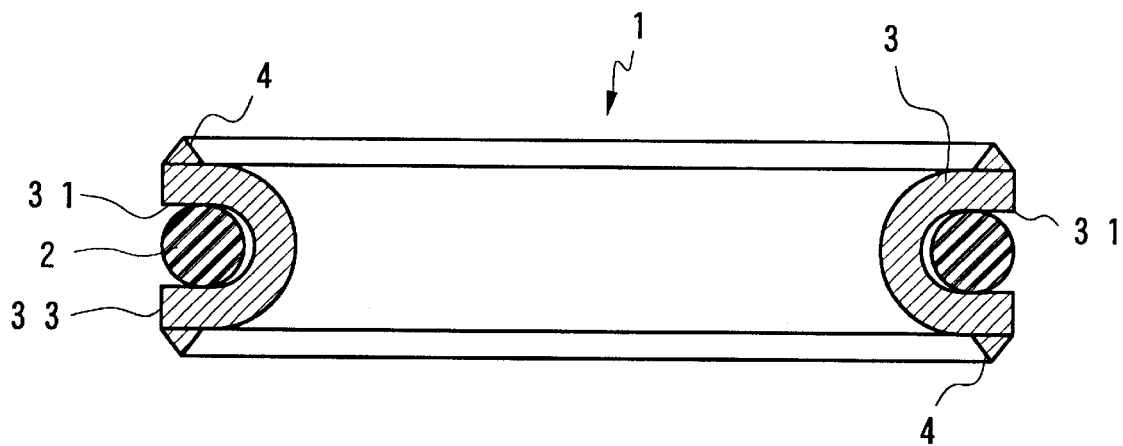
FIG. 5 is a sectional view of FIG. 4 taken along line X—X.
Figure 6:
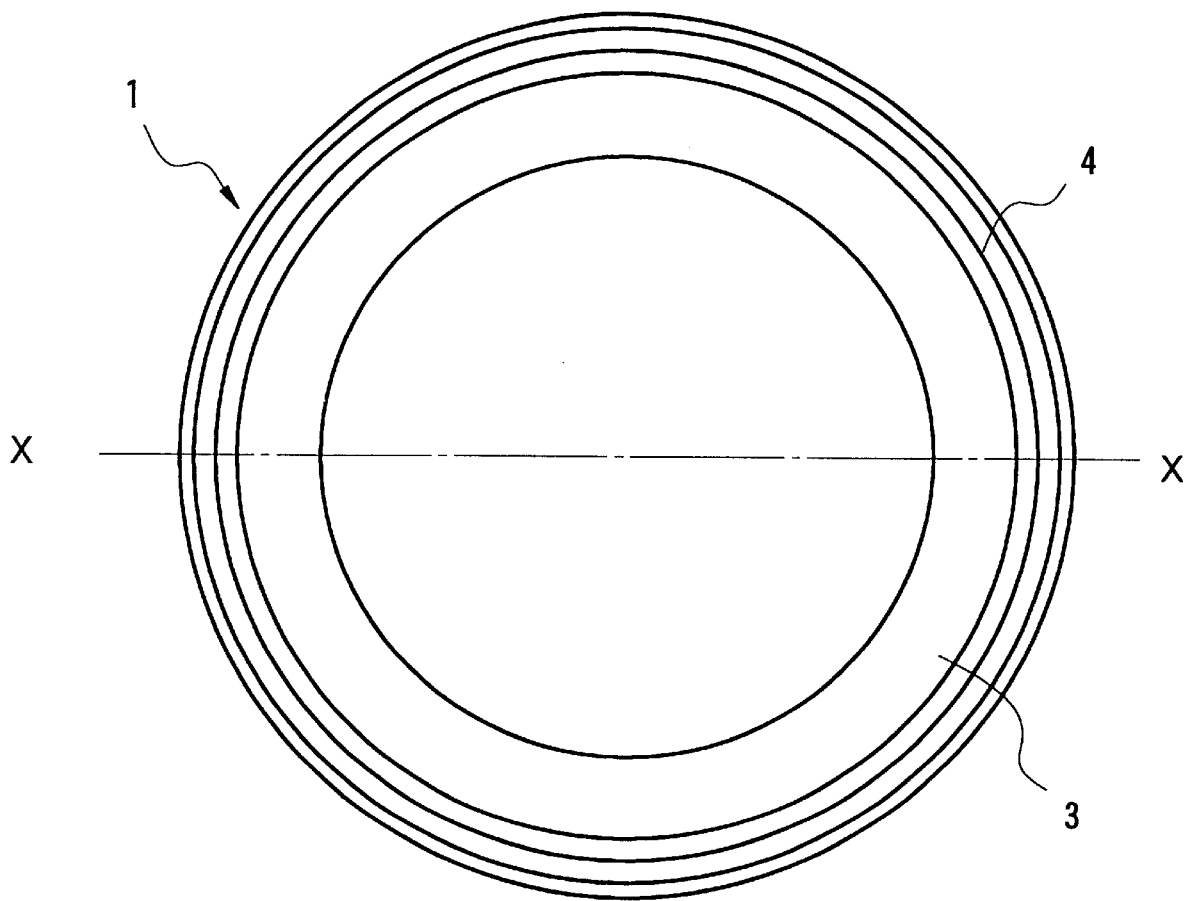
FIG. 6 is a plan view of another embodiment of the present invention wherein the seal has not been clamped.
Figure 7:
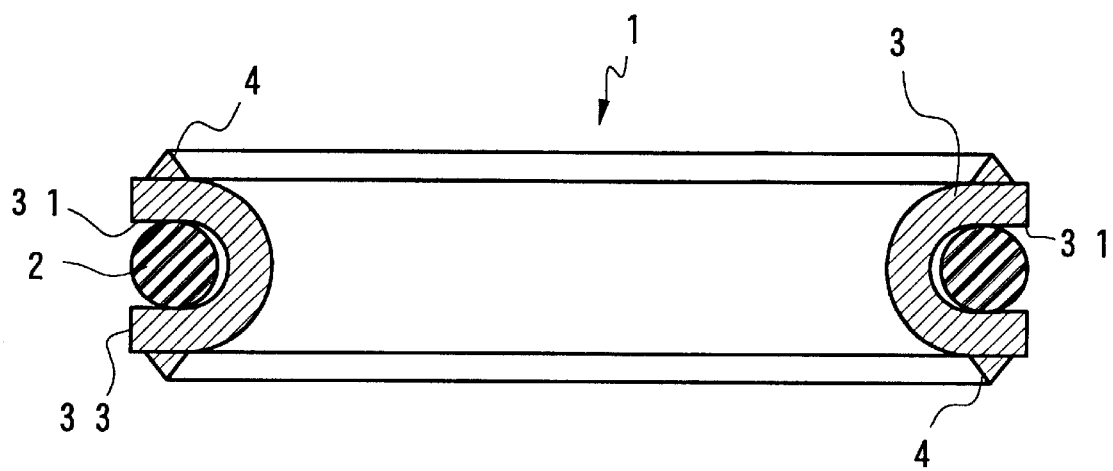
FIG. 7 is a sectional view of FIG. 6 taken along line X—X.
Figure 8:
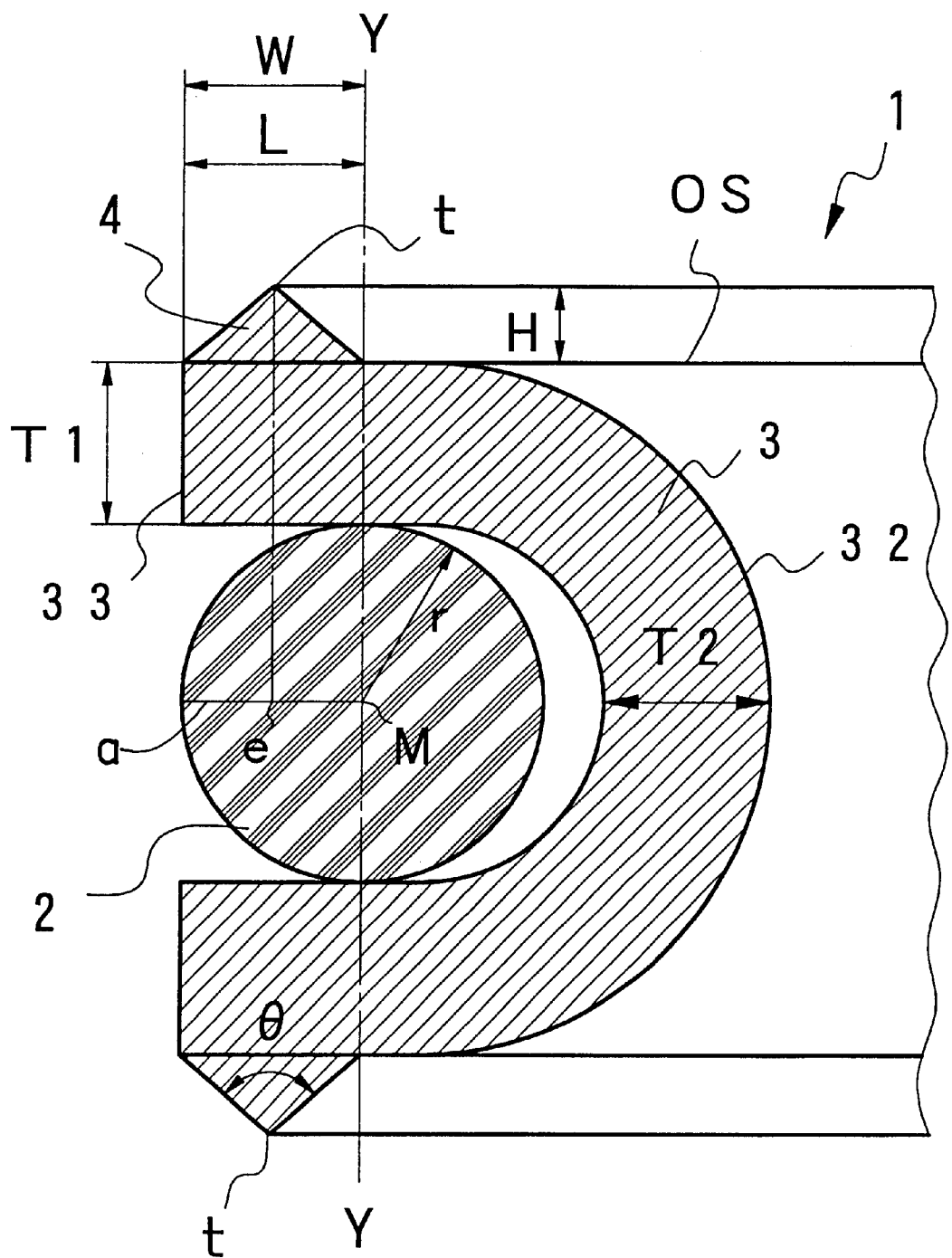
FIG. 8 is a partially enlarged sectional view of FIG. 5.

Hereinafter the present invention is described in detail by referring to embodiments. FIG. 1 is a plan view showing one embodiment of the present invention wherein the seal has not been clamped; FIG. 2 is a sectional view of FIG. 1 taken along line X—X; and FIG. 3 is a sectional view of the embodiment of FIG. 1 taken along line X—X, wherein the seal has been clamped. FIG. 4 is a plan view of another embodiment of the present invention wherein the seal has not been clamped; and FIG. 5 is a sectional view of FIG. 4 taken along line X—X. FIG. 6 is a plan view of another embodiment of the present invention wherein the seal has not been clamped; and FIG. 7 is a sectional view of FIG. 6 taken along line X—X. FIG. 8 is a partially enlarged sectional view of FIG. 5.

In FIG. 1–FIG. 8, 1 is a ring seal, 2 is an O ring made from an elastic organic polymer, 3 is a metal jacket, and 31 is an opening of the metal jacket 3. In FIG. 4–FIG. 8, 4 is a lip formed on the outer surface of the metal jacket 3.

In the embodiments shown in FIG. 1–FIG. 3, the metal jacket 3 has a U-shaped section and an O ring 2 is housed in the recessed, U-shaped portion. The sectional shape of the metal jacket here is that obtained when the seal is cut in the clamping direction to open the ring of the metal jacket. The opening of said jacket, when the sealed space is on the inner side of the jacket in the radial direction, is located at the outer end of the jacket in the radius direction. This seal 1 is set at a predetermined position of a vacuum apparatus (not shown) and clamped from the top and the bottom thereof toward the direction of an arrow in FIG. 2, the height of the openings 31 of the U-shaped section of metal jacket 3 becomes smaller, and at the same time, the O ring 2 in the U-shaped recess is clamped to have a deformed sectional shape as shown in FIG. 3. As a consequence, superior sealing effect is produced due to the inner stress, i.e. repulsion, produced by the deformation of the O ring 2 and the metal jacket 3.

In achieving the sealing effect, the inner surface 32 (see FIG. 1 and FIG. 3) of the metal jacket 3 may be exposed to the sealed space of the vacuum apparatus. The opening 31 and the outer surface 33 of the metal jacket 3 are exposed toward the opposite side of the sealed space. In other words, due to the opening facing toward the outside of the vacuum apparatus, the O ring 2 in the U-shaped recess of the metal jacket 3 is shut out from the sealed space of the vacuum apparatus by the metal jacket 3. When the O ring 2 is made from an elastic organic polymer and releases a crosslinking residue or various other volatile components or a gas, such gas and particles are prevented from moving into the sealed space of the vacuum apparatus by the metal jacket 3.

The embodiment shown in FIG. 4–FIG. 5 and the embodiment shown in FIG. 6–FIG. 7 differ from the embodiment shown in FIG. 1–FIG. 3 in the presence of a lip 4 formed on the outer surface of the ring metal jacket 3. The lip is a mountain range-shaped protrusion extending in the direction of the outer surface of the ring metal jacket. The protrusion extends about the entire circumference of the circle, and like the metal jacket, forms a closed circle. In the embodiment of FIG. 4–FIG. 5, the lip 4 has a triangular sectional shape (sectional shape that appears when cut to open the ring, like the sectional shape of the metal jacket), and extends to the outer surface 33 of the metal jacket 3. In contrast, in the embodiment of FIG. 6–FIG. 7, the lip 4 having the same triangular section is set at a position somewhat distant from the outer surface 33 of the metal jacket 3. In the present invention, the lip 4 is not an essential member but enhances the sealing effect by being press-adhered to the contact surface in the groove where the seal 1 is to be disposed. The embodiment shown in FIG. 4 and FIG. 5 and the embodiment shown in FIG. 6 and FIG. 7 afford a sealing effect upon clamping that causes deformation of the seal to produced repulsion basically in the same manner as in the embodiment of FIG. 1–FIG. 3.

Referring to FIG. 8, the preferred structure and size of the inventive seal are explained. In FIG. 8, r is the radius of the O ring 2, T1 is the thickness of the end portion of the metal jacket 3, T2 is the thickness of the U-shaped bottom of the metal jacket 3, L is the length from line Y—Y passing the center M of the O ring 2 to the outer surface 33 of the metal jacket 3, t is the vertex of the triangular cross section of lip 4, which is not abutting the jacket e is the intersection of the normal line a at the outermost point of the section of the O ring 2 and the perpendicular line drawn from the vertex t toward the normal line a, H is the height of the, triangle, W is the length of the side of the triangle abutting the jacket, and θ is the angle of the vertex t.

The radius r of the O ring 2 varies depending on the purpose of use of the seal of the present invention and the size of the apparatus in need of the seal. Taking the case wherein the seal of the present invention is applied to a normal vacuum apparatus for example, it is approximately 0.5–5 mm. The thickness T1 and T2 of the metal jacket 3 varies somewhat depending on the kind of metal forming the jacket, particularly, hardness and elastic modulus, but it is generally about 0.2 r–1.5 r. In FIG. 8, T1 and T2 are the same and also the same as r. In the present invention, T1 and T2 are not necessarily the same. The thickness of them may be varied and the clamping force applied to seal 1 may be adjusted or controlled.

When the length L from line Y—Y to the outer surface 33 of the metal jacket 3 is too short, such as nil, and the outer surface 33 of the metal jacket 3 is on the line Y—Y, the O ring 2 sometimes extrudes from the jacket opening 31 due to the failure of the metal jacket 3 to clamp the O ring 2 when seal 1 is clamped. Therefore, the length L is preferably at least about 0.1 r, more preferably at least about 0.2 r, and particularly preferably about 0.2 r–1.5 r. In FIG. 8, L equals r. In the present invention, the parts of the metal jacket 3 that extend outwardly from the line Y—Y function as one means for preventing extrusion of the O ring 2 from the jacket opening.

An alternative means for preventing the extrusion of the O ring 2 from the jacket opening may be extrusion-preventing protrusion set on the inner wall of the U-shaped recess of the metal jacket 3.

In the present invention, the position of the lip 4 is subject to no particular limitation. When it is set on the side nearer to the inner surface 32 of the metal jacket 3 from the line Y—Y in FIG. 8, however, the O ring 2 tends to extrude easily from the opening 31 upon clamping of the seal. On the other hand, when the lip 4 is too near to the outer surface 33 of the metal jacket 3, the sealing effect afforded by clamping the seal tends to be reduced. Therefore, the position of the lip 4 is preferably such that its vertex t is in parallel relation to the pressure receiving surface when the seal is clamped, and the position of the intersection e of the normal line a at the outermost point of the section of the O ring 2 and the perpendicular line drawn from the vertex t toward the normal line a is at about 0.1 r–0.7 r, preferably 0.2 r–0.7 r, particularly about 0.3 r–0.6 r from the center M of the O ring. By the pressure receiving surface of the seal is meant the surface that receives the clamping pressure from the clamping direction of the seal. In FIG. 8, the position e, which is the projected vertex t on the normal line a, is at 0.5 r from the center M of the O ring.

When the height H and the length of the bottom side W of the Lip 4 are too small, the effect provided by the lip is poor, whereas when they are too large, the seal-clamping force, and consequently, sealing function become unstable. Thus, the height H is preferably about 0.2 r–0.7 r, particularly about 0.3 r–0.6 r, and the length of the bottom side W is preferably about 0.3 r–2 r, particularly 0.5 r–1.6 r. In FIG. 8, the height H is 0.5 r, the length of the bottom side W is 1 r. The angle θ of the vertex t of the lip 4 is preferably about 50–130°, particularly about 60–110°.

The sectional shape of the lip 4 may be other than the above-mentioned triangle, and may be semicircle, semiellipse or various other shapes. The position and height thereof, as well as the length of the bottom side of the lip other than the above-mentioned lip, can be easily set after trail and error as necessary, by reference to the above-mentioned triangle.

The elastic organic polymer to form the O ring 2 may be, for example, rubbers such as natural rubber, ethylene propylene rubber, ethylene propylene diene rubber (EPDM), acrylonitrile butadiene rubber, hydrogenated acrylonitrile butadiene rubber, styrene butadiene rubber, silicone rubber, chloroprene rubber, chlorosulfonated polyethylene rubber, fluorine rubber, fluorinated silicone rubber, acrylic rubber, ethylene acrylic rubber and the like and their crosslinked rubbers, and thermoplastic elastomers such as thermoplastic polystyrene elastomer, thermoplastic polyolefin elastomer, thermoplastic poly (vinyl chloride) elastomer, thermoplastic polyester elastomer and the like. In particular, preferred is the one that is free of crystal melting point on the differential calorie curve of DSC (differential scanning calorimeter).

The O ring can be produced by adding, to the elastic organic polymer, additives typically used for the production of an elastic organic polymer O ring, at normal amounts as necessary, such as antioxidant, aging preventive, reinforcing agent such as carbon black, fillers such as talc and clay, crosslinking agent, crosslinking auxiliary, corsslinking accelerator, processing aids and the like, and subjecting the resulting composition to press forming, injection forming and the like. The crosslinked rubber O ring is crosslinked by heating in the forming process such as press forming, injection forming and the like.

The O ring made from an elastic organic polymer requires a markedly smaller clamping force as compared to a helical coil used for the C ring with a coil spring, so that those having a considerably high hardness can be also used in the present invention. Of those, one having a Shore A hardness of approximately 60–100, particularly 70–90, is preferable.

The metal to form the metal jacket and lip may be any except ones that are thermally, chemically or mechanically unstable under the environment in which the seal is used. Particularly, for a metal jacket as shown in FIG. 1–FIG. 8, which has a U-shaped sectional shape and an opening 31, a soft metal, such as metals having comparatively superior processability (e.g., aluminum, aluminum alloy, soft copper, copper alloy, magnesium alloy and the like) and a metal-ceramic complex, all of which can reduce the opening with a comparatively small clamping force, are preferable.

EXAMPLE 1

A composition comprising carbon black (80 parts by weight), a plasticities (10 parts by weight), a crosslinking agent (3 parts by weight) and a crosslinking auxiliary (5 parts by weight) per 100 parts by weight of hydrogenated acrylonitrile butadiene rubber was used to produce a crosslinked nitrile O ring (Shore A hardness:80) having a ring inner diameter 55 mm and a sectional radius r of 1.2 mm under the conditions of temperature 180° C. and crosslinking time 4 min.

Pure aluminum jackets having a purity of 99.5 wt % are set to cover the O rings to give ring seals having the structure shown in FIG. 4–FIG. 5 and FIG. 8. The detailed size of the seals are as follows: T1: 1.2 mm, T2: 1.2 mm, L:1.0 mm, W: 1.2 mm, H:0.6 mm, position of e:0.6 mm from the center M.

The force necessary for clamping the inventive seal to 70% of the height of the seal before clamping was approximately 15 kg/cm. This figure is about 1/100 of a stainless metal O ring having the same size and the smallest strength and a typical C ring having an SUS coil spring.

The seal of the present invention does not release a foreign material into the sealed space, nor does it require a great force for clamping. Accordingly, it is useful as a vacuum seal that achieves miniaturization and reduced weight of a vacuum apparatus. In particular, by making the sectional shape of the metal jacket a U shape, the core can be easily detached and attached for fitting after forming the jacket, and the inside of the jacket can be washed easily.

This application is based on application No. 300988/1997 filed in Japan, the content of which is incorporated hereinto by reference.

What is claimed is:

1. A ring seal for use in sealing an inner space defined at an inner periphery thereof, comprising:

a core made from an elastic organic polymer; and a metal jacket surrounding said core to prevent transfer of a substance generated from said core into the inner space defined at the inner periphery of said ring seal;

wherein said metal jacket has a U-shaped sectional shape which opens in a direction facing away from the inner space defined at the inner periphery of said ring seal;

wherein said core comprises on O ring such that said ring seal is a circular seal;

wherein said metal jacket has a lip on an outer surface thereof to improve sealing;

wherein said metal jacket includes a clamping surface, and said lip has a vertex extending in parallel to said clamping surface; and wherein an intersection of a normal line at a radially outermost point of a cross section of said O ring and a line perpendicular to said normal line and extending through said vertex is located a radial distance from a center of said cross section of said O ring in a range of 0.1–0.7 times a radius of said cross section of said O ring.

* * * * *